(12) United States Patent
Haapanen (10) Patent No.: US 11,200,009 B2
(45) Date of Patent: Dec. 14, 2021

(54) MANAGING THE CONFIGURATIONS OF PRINTING DEVICES

(71) Applicant: Tom Haapanen, Kitchener (CA)

(72) Inventor: Tom Haapanen, Kitchener (CA)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/805,654

(22) Filed: Feb. 28, 2020

(65) Prior Publication Data

US 2021/0271430 A1    Sep. 2, 2021

(51) Int. Cl.
*G06F 3/12* (2006.01)

(52) U.S. Cl.
CPC .......... *G06F 3/1205* (2013.01); *G06F 3/1254* (2013.01); *G06F 3/1285* (2013.01); *G06F 3/1297* (2013.01)

(58) Field of Classification Search
CPC .... G06F 3/1205; G06F 3/1254; G06F 3/1285; G06F 3/1297
USPC .......................................... 358/1.1–1.18, 474
See application file for complete search history.

(56) References Cited

U.S. PATENT DOCUMENTS

| | | | | |
|---|---|---|---|---|
| 6,693,722 B1 * | 2/2004 | Mixer, Jr. | ............... | G06K 15/00 358/1.13 |
| 6,814,510 B1 * | 11/2004 | Sabbagh | ............... | G06F 3/1204 400/61 |
| 8,291,312 B1 | 10/2012 | Zhou | | |
| 2006/0023246 A1 | 2/2006 | Vidyanand | | |
| 2007/0146733 A1 | 6/2007 | Kennis | | |
| 2011/0128572 A1 | 6/2011 | Hosotsubo | | |
| 2011/0222114 A1 | 9/2011 | Wakabayashi | | |
| 2013/0128305 A1 | 5/2013 | Grabkowitz | | |
| 2013/0235407 A1 | 9/2013 | Kobayashi | | |
| 2014/0240739 A1 | 8/2014 | Hattori | | |

(Continued)

FOREIGN PATENT DOCUMENTS

| | | |
|---|---|---|
| EP | 2759924 | 7/2014 |
| JP | 2019/006099 | 1/2019 |

OTHER PUBLICATIONS

Haapanen, U.S. Appl. No. 16/805,655, filed Feb. 28, 2020, Office Action dated Sep. 30, 2020.

(Continued)

*Primary Examiner* — Gabriel I Garcia
(74) *Attorney, Agent, or Firm* — Hickman Becker Bingham Ledesma LLP; Edward A. Becker (57) ABSTRACT

An approach is provided for managing the configurations of printing devices in a distributed environment where printing devices are initially configured at a first physical location and then reconfigured at a second physical location. A configuration manager provides configuration data to a configuration system at the first location to be used to initially configure printing devices. The configuration manager also provides the configuration data to a device management system at the second physical location. The configuration manager receives changes to the configuration data from the device management system at the second physical location and propagates the changes to the configuration system at the first physical location. The configuration manager also tracks the configuration state of printing devices at both the first physical location and the second physical location.

20 Claims, 8 Drawing Sheets

(56) References Cited

U.S. PATENT DOCUMENTS

| | | |
|---|---|---|
| 2015/0172484 A1 | 6/2015 | Kanno |
| 2015/0264198 A1 | 9/2015 | Kamiya |
| 2015/0286452 A1 | 10/2015 | Kim |
| 2016/0306596 A1 | 10/2016 | Yasuda et al. |
| 2017/0243272 A1 | 8/2017 | Zakharov |
| 2019/0087138 A1* | 3/2019 | Suzuki ................ G06F 3/1254 |
| 2019/0359379 A9 | 11/2019 | Nelson et al. |
| 2021/0271436 A1 | 9/2021 | Haapanen et al. |
| 2021/0271437 A1 | 9/2021 | Haapanen et al. |

OTHER PUBLICATIONS

Haapanen, U.S. Appl. No. 16/805,655, filed Feb. 28, 2020, Office Action dated Feb. 19, 2021.
Haapanen, U.S. Appl. No. 16/805,655, filed Feb. 28, 2020, Final Office Action dated Jun. 25, 2021.
Haapanen, U.S. Appl. No. 16/805,651, filed Feb. 28, 2020, Office Action dated May 21, 2021.
Haapanen, U.S. Appl. No. 16/805,655, filed Feb. 28, 2020, Non-Final Rejection, dated Oct. 26, 2021.
Haapanen, U.S. Appl. No. 16/805,655, filed Feb. 28, 2020, Advisory Action, dated Sep. 9, 2021.
Haapanen, U.S. Appl. No. 16/805,651, filed Feb. 28, 2020, Final Rejection, dated Sep. 20, 2021.

* cited by examiner

Configuration Selection Data 300

| Customer | Printing Device Type | Configuration |
|---|---|---|
| Customer A | Type 1 | C1-A |
| | Type 2 | C2-A |
| | Type 3 | C3 |
| Customer B | Type 1 | C1 |
| | Type 2 | C2 |
| | Type 3 | C3 |
| Customer C | Type 1 | C1-C |
| | Type 2 | C2 |
| | Type 3 | C3-C |
| Default | Type 1 | C1 |
| | Type 2 | C2 |
| | Type 3 | C3 |

Configuration Key:

C1, C2, C3 = standard configurations

C1-A, C1-C, C2-A, C3-C = customer-specific configurations

FIG. 3C

Printing Device Data 320

| Serial Number | Type | Customer ID | Configuration |
|---|---|---|---|
| SN1 | Type 1 | Customer A | C1-A |
| SN2 | Type 2 | Customer B | C2 |
| SN3 | Type 1 | Customer C | C1-C |
| SN4 | Type 3 | Customer C | C3-C |
| SN5 | Type 2 | Customer C | C2 |
| SN6 | Type 1 | Customer B | Customer B-C1 |
| SN7 | Type 1 | Customer A | |
| SN8 | Type 1 | Customer C | C1-C |
| SN9 | Type 2 | Customer A | C2-A |
| SN10 | Type 3 | Customer A | C3 |
| SN11 | Type 2 | Customer B | C2 |
| SN12 | Type 2 | Customer A | |
| SN13 | Type 1 | Customer A | C1-A |
| SN14 | Type 1 | Customer A | C1-A |
| SN15 | Type 3 | Customer C | |
| SN16 | Type 2 | Customer C | |
| SN17 | Type 3 | Customer B | |

Configuration Key:

C1, C2, C3 = standard configurations

Customer B-C1, Customer C-C2 = customer-specific configurations

Blank = printing device not yet configured

MANAGING THE CONFIGURATIONS OF PRINTING DEVICES

RELATED APPLICATION DATA

This application is related to U.S. patent application Ser. No. 16/805,651 entitled "CONFIGURING PRINTING DEVICES", filed Feb. 28, 2020 and U.S. patent application Ser. No. 16/805,655 entitled "CONFIGURING PRINTING DEVICES USING A MOBILE DEVICE", filed Feb. 28, 2020, the contents all of which are incorporated by reference in their entirety for all purposes as if fully set forth herein.

FIELD

The technical field of the present disclosure relates to configuring printing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Printing devices are often pre-configured at manufacturers or warehouses with standard configurations to enable large numbers of printing devices to be configured efficiently. Customers often change or customize the standard configurations to accommodate their particular operating environment. For example, customers may change paper/quality settings, effects settings, finishing settings and advanced settings based upon their preferences. Customers may also change security settings to comply with an organization policy. One of the issues with these configuration changes is that there is no mechanism for the changes to be propagated back to the manufacturer or warehouses and applied to future printing devices sold to the customer. This forces organizations to always reconfigure new printing devices to meet their needs, which consumes IT resources and places additional burdens on organizations that do not have their own IT staff.

SUMMARY

An apparatus comprises one or more processors, one or more memories, and a configuration manager executing on the apparatus. The configuration manager is configured to receive, from a configuration system via one or more computer networks, first configuration data that specifies a first plurality of printing device settings and cause the first configuration data to be transmitted, via the one or more computer networks, to a device management system that includes a capability for a user to create, based upon the first configuration data, second configuration data that specifies a second plurality of printing device settings that is different than the first plurality of printing device settings. The configuration manager receive the second configuration data from the device management system via the one or more networks and cause the second configuration data to be transmitted to the configuration system via the one or more networks, wherein the configuration system applies the second configuration data to one or more printing devices.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Printing Device Architecture
  A. Printing Device
  B. Configuration Manager
  C. Configuration System
  D. Device Management System
III. Managing Printing Device Configurations
IV. Implementation Examples I. Overview An approach is provided for managing the configurations of printing devices in a distributed environment where printing devices are initially configured at a first physical location and then reconfigured at a second physical location. A configuration manager provides configuration data to a configuration system at the first location to be used to initially configure printing devices. The configuration manager also provides the configuration data to a device management system at the second physical location. The configuration manager receives changes to the configuration data from the device management system at the second physical location and propagates the changes to the configuration system at the first physical location. The configuration manager also tracks the configuration state of printing devices at both the first physical location and the second physical location.

As used herein, the term "configuration data" refers to data that specifies settings for printing devices. Example settings include, without limitation, paper/quality settings, effects settings, finishing settings, advanced settings, and security settings. Example security settings include, without limitation, HTTPS settings, IPP settings, TLS settings, encryption settings, FTP settings, WSD settings, RHPP settings, SNMP settings, etc. For example, security settings may pertain to user authentication for accessing a printing device, data overwrite and encryption on printing device storage, disabling certain communications protocols considered to be less secure, etc. As used herein, the term "configuration" refers to settings for a printing device and the term "current configuration" refers to settings currently applied to a printing device.

The approach described herein for managing the configurations of printing devices in a distributed environment provides a technical solution to the technical problem of how to manage changes made to the configuration of printing devices and to propagate those changes to appropriate physical locations. The technical solution provides a user-friendly method for managing maintaining consistent and secure printing device configurations.

II. Printing Device Configuration Architecture

Figure 1:
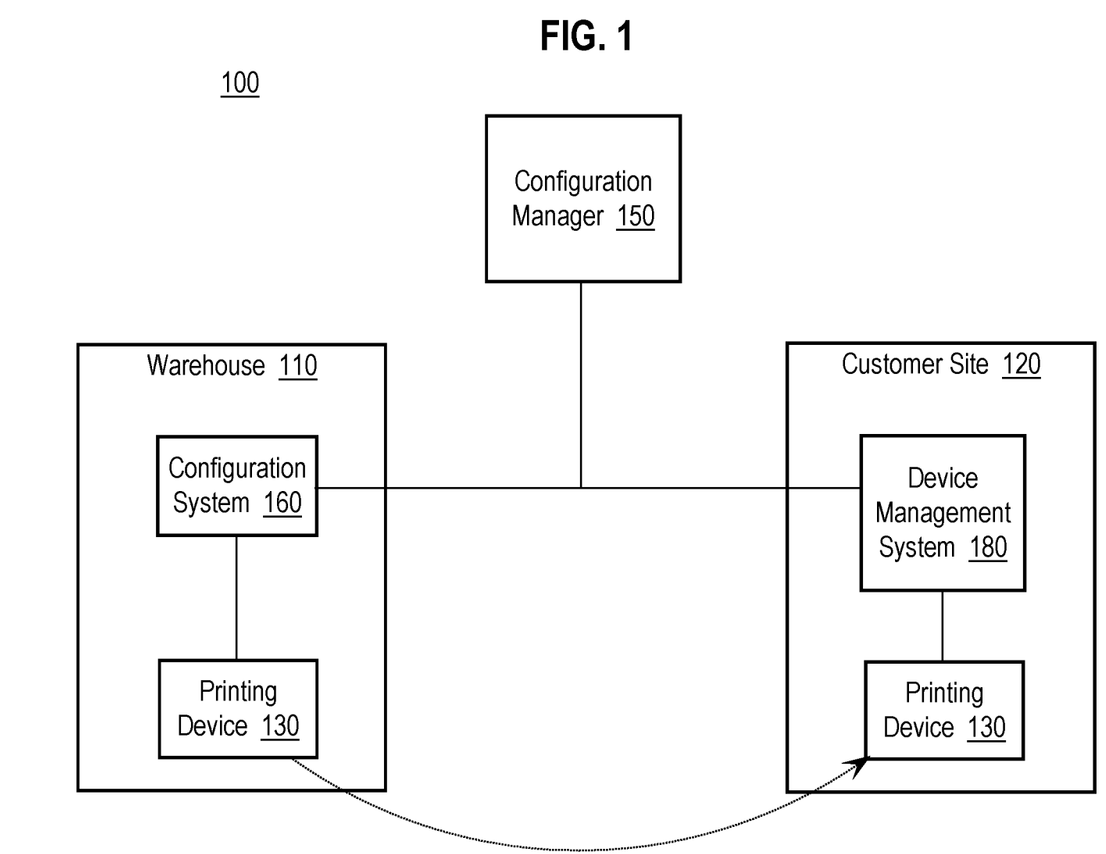
FIG. 1 is a block diagram that depicts a printing device configuration arrangement.

FIG. 1 is a block diagram that depicts a printing device configuration arrangement 100. Arrangement 100 includes a warehouse 110, a customer site 120, a printing device 130, and a configuration manager 150. The warehouse 110 is any physical location where the printing device 130 is initially configured prior to being relocated to the customer site 120, as depicted in FIG. 1. The term "warehouse" is used herein for explanation purposes only and the warehouse 110 is not limited to a warehouse per se, and may include other physical locations such as a manufacturer, a distributor, etc. The customer site 120 is any physical location where the printing device 130 is in use. The term "customer site" is used herein for explanation purposes only and the customer site 120 is not limited to a customer site per se and may include other physical locations where the printing device 130 is in use. The warehouse 110 includes a configuration system 160 for configuring printing devices at the warehouse 110. The customer site 120 includes a device management system 180 for configuring printing devices at the customer site 120. Although embodiments are depicted in the figures and described herein in the context of a single customer site 120 for purposes of explanation, embodiments are applicable to any number of customer sites and any number of printing devices at those customer sites.

The elements of arrangement 100 may be communicatively coupled via one or more wireless and/or wired computer networks of any type, and/or direct communications links that are not depicted in FIG. 1 for purposes of explanation. Arrangement 100 may include additional or fewer elements, depending upon a particular implementation. The approach for configuring printing devices is described in the context of configuring a single printing device 130 for purposes of explanation, but embodiments are applicable to configuring any number of printing devices.

A. Printing Device

Figure 2:
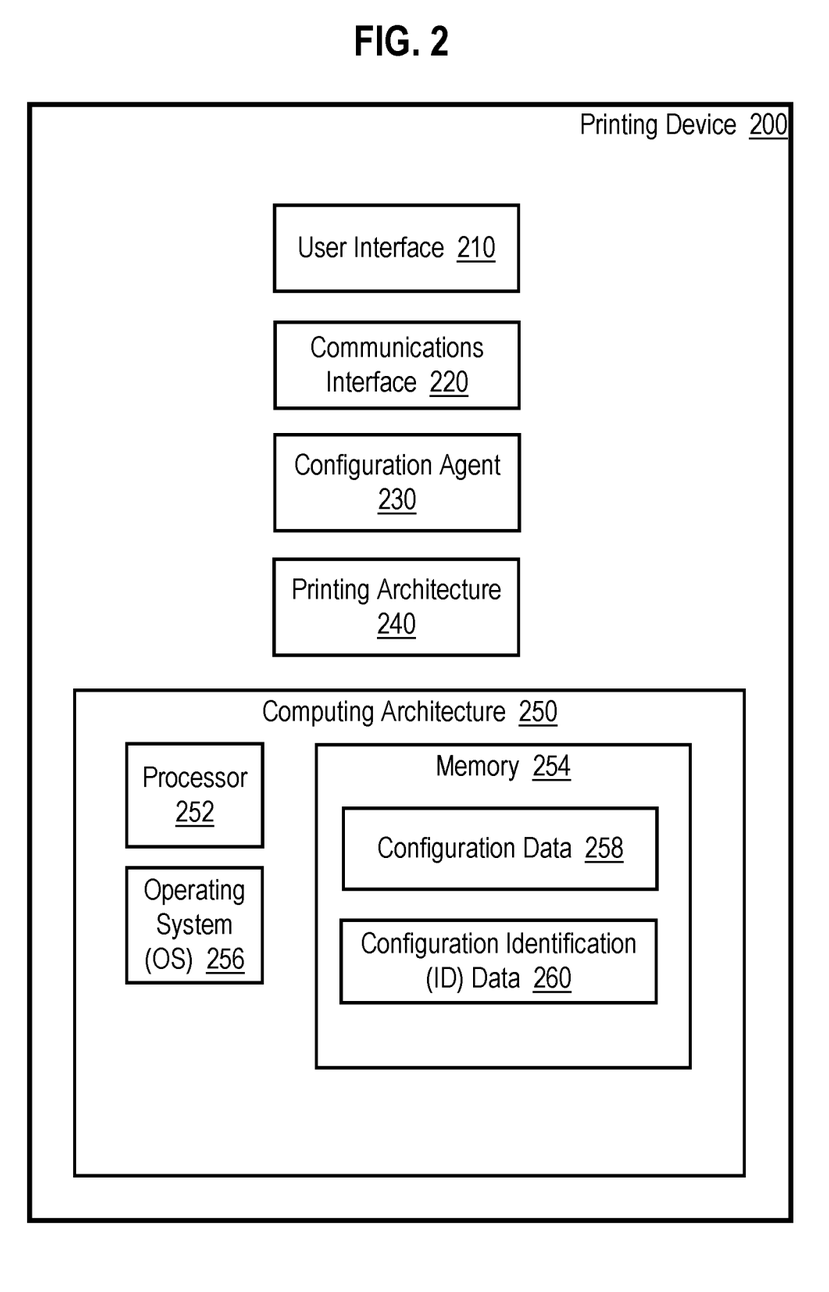
FIG. 2 is a block diagram that depicts an example implementation of a printing device.

The printing device 130 is a device that prints print jobs, such as electronic documents. Embodiments are applicable to any type of printing device and example printing devices include, without limitation, printers, copiers, facsimile machines, and Multi-Function Peripherals (MFPs). FIG. 2 is a block diagram that depicts an example implementation of a printing device 200 that includes a user interface 210, a communications interface 220, a configuration agent 230, a printing architecture 240, and a computing architecture 250.

The user interface 210 allows a user to input information to the printing device 200 and/or displays information to the user. For example, the user interface 210 may be implemented by a display screen, a control panel, a keyboard, a pointing device such as a mouse, or any combination thereof. The user interface 210 may include graphical user interface controls displayed on a touch screen that convey information a user about the functionality and status of the printing device and also allow a user to select functions and input information to the printing device 200.

The communications interface 220 provides for the exchange of data between the printing device 200 and other computing elements via wired, wireless, or direct connections. The configuration agent 230 configures (and reconfigures) the printing device 130 with configuration data, as described in more detail hereinafter. The configuration agent 230 may implement one or more Application Program Interfaces (APIs) supported by the configuration system 160 and/or the device management system 180 and/or communicate with the configuration system 106 and/or the device management system 180 via an HTTP or HTTPS connection. The configuration agent 230 may be implemented by one or more computer-implemented processes of any type. Furthermore, although the configuration agent 230 is depicted as a separate element for discussion purposes, the functionality provided by the configuration agent 230 may be integrated into other processes and/or elements on printing device 200.

The printing architecture 240 includes hardware elements, software elements, or any combination of hardware elements and software elements for printing electronic data, such as print jobs. This may include, for example, a paper transport, logic circuits, a toner cartridge, a photosensitive drum, a laser, one or more coronas, a fuser, an erase lamp, power supply, etc.

The computing architecture 250 includes a processor 252, a memory 254, and an OS 256. The processor 252 may be implemented by one or more microprocessors and associated computer hardware and/or computer software. The memory 254 may be implemented by volatile memory, non-volatile memory, or any combination of volatile and non-volatile memory. The OS 256 may be implemented by any type of operating system that may vary depending upon a particular implementation.

B. Configuration Manager

The configuration manager 150 manages the configurations of printing devices as described herein. The configuration manager 150 may be implemented by one or more processes, such as a cloud application, a server process, etc. For example, the configuration manager 150 may be a process hosted on a server of a business organization, hosted as a cloud service accessible via the Internet, etc. The configuration manager 150 may provide an Application Program Interface (API) for exposing the functionality and data of the configuration manager 150.

According to an embodiment, the configuration manager 150 uses different types of data to manage the configuration of printing devices. The data may be stored locally on a computing device on which the configuration manager 150 is executing, or remote from the configuration manager 150, for example, in a database management system, data repository, etc.

Figure 3A:
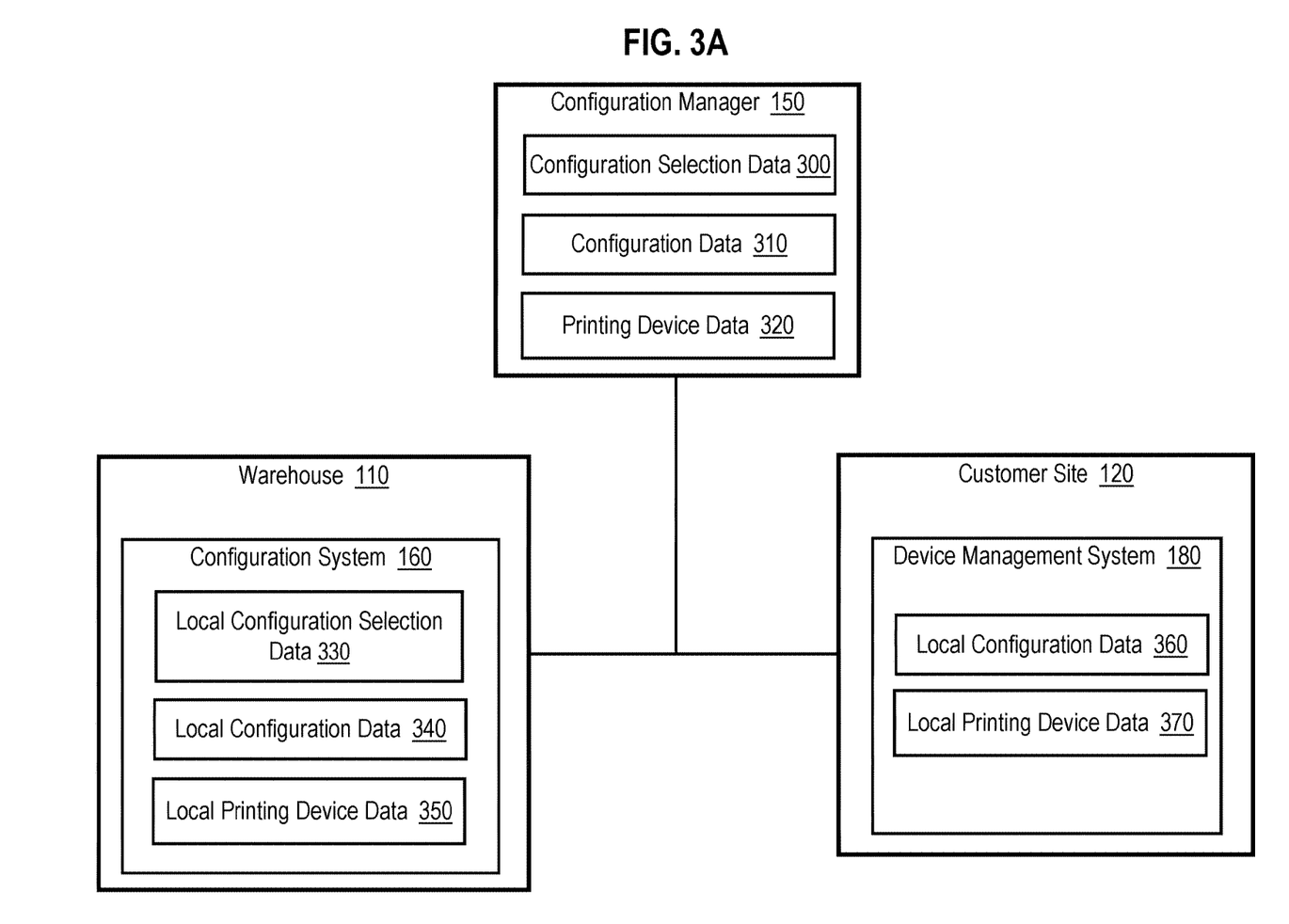
FIG. 3A is a block diagram that depicts configuration selection data, configuration data, and printing device data used by the configuration manager to manage the configuration of printing devices.

FIG. 3A is a block diagram that depicts configuration selection data 300, configuration data 310, and printing device data 320 used by the configuration manager 150 to manage the configuration of printing devices. The configuration selection data 300, configuration data 310, and printing device data 320 may be maintained in any form or structure, depending upon a particular implementation, and although depicted in the figures and described herein as separate, may be combined in any manner.

Figure 3B:
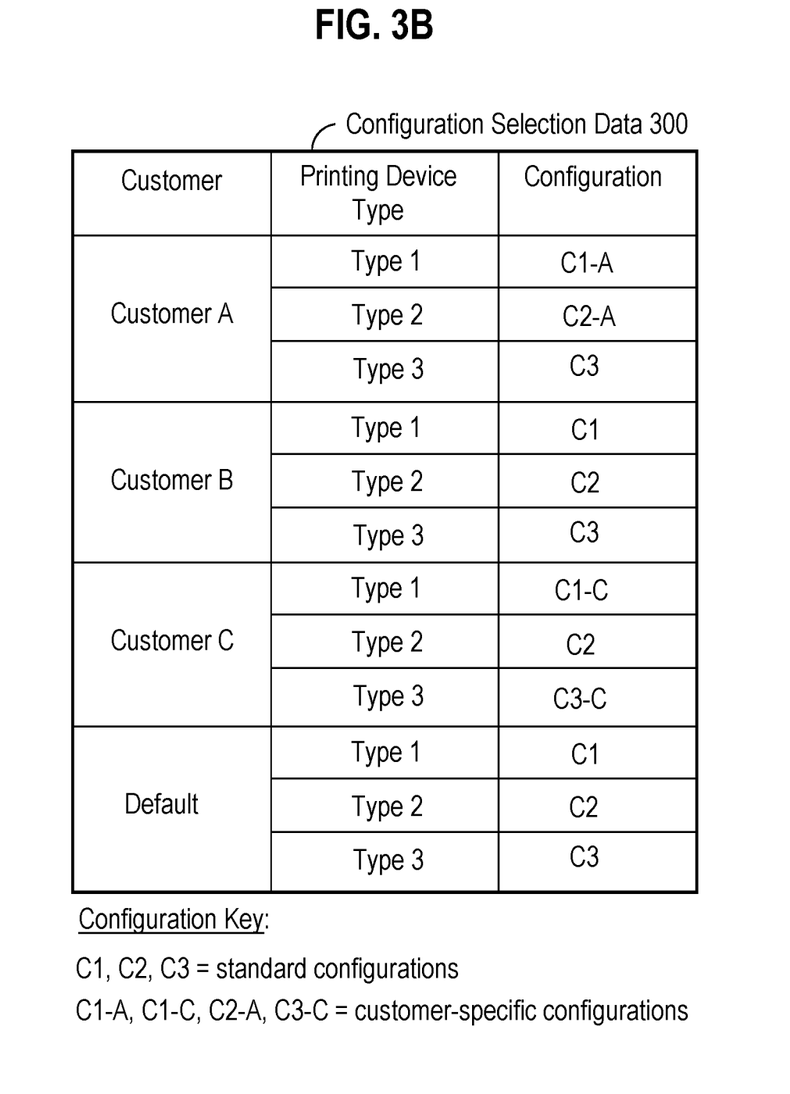
FIG. 3B is a block diagram that depicts example configuration selection data managed by the configuration manager.

The configuration selection data 300 specifies one or more configurations to be used for each type of printing device, for each customer. FIG. 3B is a block diagram that depicts example configuration selection data 300 managed by the configuration manager 150. In this example, there are three customers (Customer A, Customer B, Customer C) and three types of printing devices (Type 1, Type 2, Type 3). There are three standard configurations (C1, C2, C3) that correspond, respectively, to the three types of printing devices (Type 1, Type 2, Type 3). The standard configurations (C1, C2, C3) include settings that are appropriate for the corresponding type (Type 1, Type 2, Type 3) of printing device. For example, the standard configurations may include settings that are known to be stable with the corresponding type of printing device.

Custom configurations are specified for certain customers and types of printing devices. These include a custom configuration (C1-A) for Type 1 printing devices for Customer A, a custom configuration (C2-A) for Type 2 printing devices for Customer A, a custom configuration (C1-C) for Type 1 printing devices for Customer C, and a custom configuration (C3-C) for Type 3 printing devices for Customer C. The settings in the custom configurations may be established by customers based upon their operating environment, user preference, policies, etc. For example, a particular customer at the customer site 120 may use the device management system 180 to create a custom configuration that uses security settings to provide greater security than standard configurations. The configuration selection data 300 also specifies configurations for different types of printing devices that are not assigned to a particular customer. The configuration selection data 300 may include other data that may vary depending upon a particular implementation and embodiments are not limited to the example data depicted in the figures and described herein.

As described in more detail hereinafter, the configuration system 160 uses the configuration selection data 300 to determine the configurations to be applied to printing devices at the warehouse 110. for a printing device to be presented to a user of the mobile device 170.

The data in the configuration selection data 300 may be updated by a user via the configuration manager 150. For example, a user may use a client device with a Web browser to access a Web-based interface provided by the configuration manager 150. In addition, the data in the configuration selection data 300 is updated in response to changes made by the device management system 180. Although examples are described herein in the context of three customers and three types of printing devices, embodiments are not limited to these examples and are applicable to any number of customers and types of printing devices. The configuration selection data 300 may be created and maintained by an administrative user for example, using an application or a Web browser and the API of the configuration manager 150.

The configuration data 310 includes configuration data for any number and types of configurations, where each instance of configuration data includes a plurality of settings for a printing device. The configuration data 310 may also store metadata for each configuration. The metadata may include information such as a description of the configuration, popularity or rating information for the configuration, etc. The configuration data 310 may be stored in any form or format that may vary depending upon a particular implementation and may be defined by a user via a user interface of the configuration manager 150.

Figure 3C:
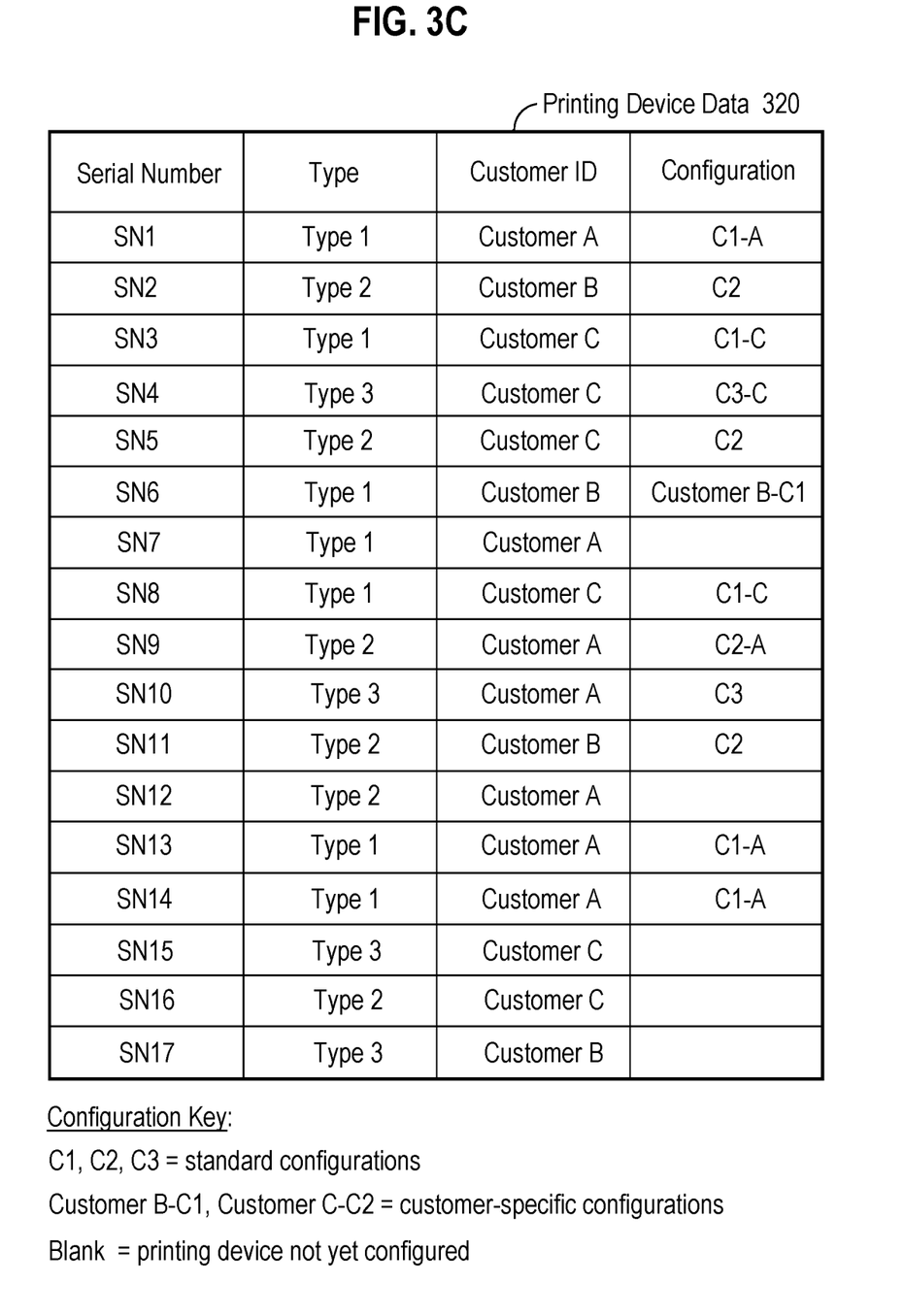
FIG. 3C is a block diagram that depicts example printing device data managed by a configuration manager.

The printing device data 320 specifies data for printing devices including whether each printing device is configured and if so, with which configuration. FIG. 3C is a block diagram that depicts example printing device data 320 managed by the configuration manager 150. In this example, the printing device data 320 is depicted as a table, where each row of the table corresponds to a particular printing device and specifies a Serial Number, a Type, a customer ID, and a Configuration. The Serial Number is a number that uniquely identifies the printing device and although serial numbers are used herein for purposes of explanation, embodiments are not limited to using serial numbers per se and any data the uniquely identifies a printing device may be used. One example is a Media Access Control (MAC) address.

The Type is the type of printing device and in this example may have the value of Type 1, Type 2, or Type 3. The Customer ID is data that identifies an entity that controls or owns the printing device and although used herein for purposes of explanation, embodiments are not limited to Customer IDs per se and any data the uniquely identifies an entity that owns or controls a printing device may be used.

The Configuration is data that identifies the configuration for a printing device and in the present example may have the value of C1, C2, C3, C1-A, C1-C, C2-A, or C3-C. A blank or null value in cell means that a configuration has not yet been assigned to the printing device. This may occur, for example, when printing devices are sold to particular customers and corresponding entries created in the printing device data 320, but those printing devices have not yet been configured using the approach described herein.

The configuration manager 150 may provide a Web-based user interface for creating and managing the configuration selection data 300, the configuration data 310, and the printing device data 320. The Web-based user interface allows an administrative user to view the current configuration status of printing devices and to add, edit, and delete printing devices represented by the printing device data 320. For example, the user interface may allow a user of a client device to add a new printing device and specify the serial number, type, customer ID and configuration, if the printing device is already configured. This may be done at any time, for example, when a printing device is sold to a customer, configured at the warehouse 110, or deployed to the customer site 120. If the new printing device is not yet configured, then the administrator does not have to specify a configuration and the printing device will be automatically configured as described herein. The administrative user may also change any of the parameters, including Serial Number, Type, and Customer ID.

Alternatively, configuration selection data 300, the configuration data 310, and the printing device data 320 may be populated based upon data received from third-party systems, such as an Enterprise Resource Planning (ERP) system, or device management systems, such as Streamline NX, by Ricoh. The user interface may also include controls that allow a user to search for printing devices by serial number (or other identifying information), customer ID, printing device type, configuration ID, etc. According to an embodiment, the configuration manager 150 tracks all actions performed with respect to the configuration selection data 300, the configuration data 310, and the printing device data 320.

C. Configuration System

The configuration system 160 is a system that allows users to design and apply configurations to printing devices. The configuration system 160 may include software executing on a computing device that allows users to design particular configurations and apply those configurations to printing devices to provide an initial configuration. For example, the configuration system 160 may include a designer user interface that allows users to design configurations by specifying settings and saving those settings as a particular configuration. After a new configuration is saved, it is stored locally and also provided to the configuration manager 150.

According to an embodiment, the configuration system 160 includes local configuration selection data 330, local configuration data 340, and local printing device data 350. The configuration system 160 uses the local configuration selection data 300 to determine which configuration should be applied to a particular printing device, based upon the customer and type of printing device. For example, suppose that a particular printing device is a Type 1 printing device for Customer B. According to the configuration selection data 300, the C1 configuration is applied to the particular printing device. As another example, for a Type 1 printing device for Customer A, the C1-A custom configuration is applied to the printing device. A user of the configuration system 160 may visually examine the local configuration selection data 330 and manually select the specified configuration. Alternatively, the configuration system 160 may use the local configuration selection data 330 to automatically select and apply a configuration to a printing device.

Upon successful configuration of a printing device, the configuration system 160 generates and transmits a confirmation message to the configuration manager 150 so that the configuration manager 150 can update the printing device data 320. In situations where the warehouse 110 handles fewer than all of the customers and configurations specified in the configuration selection data 300, then the local configuration selection data 330 may include a subset of the configuration selection data 300. Similarly, the local configuration data 340 may include a subset of the configuration data 310 and the local printing device data 350 may include a subset of the printing device data 320.

D. Device Management System

The device management system 180 is a system that allows users to apply configurations to printing devices. The device management system 180 may include software executing on a computing device that allows users to view available configurations and customize the configurations to create custom configurations. One example implementation of the device management system 180 is Streamline NX by Ricoh. The configurations may include standard configurations used by the configuration system 160 as well as custom configurations. This allows a user to start with a configuration (standard or custom) currently applied to a particular printing device, or created by the configuration system 160 and not yet applied, and then modify one or more of the settings of the configuration to create a custom configuration. According to an embodiment, the device management system 180 provides a user interface that allows users to perform these functions, for example, to view, change, and change the security settings of a standard configuration to create a customized configuration that is more secure, for example to comply with an organization policy.

According to an embodiment, the user interface includes a control that allows a user to request a recommended configuration for a particular printing device. The device management system 180 generates and transmits a request for a recommended configuration to the configuration manager 150. The configuration manager 150 determines a recommended configuration based upon a wide variety of factors that may vary depending upon a particular implementation. Example factors include, without limitation, market segment, operating environment, e.g., financial, technical, management, etc., other customer usage, industry trends, user ratings, etc. For example, the configuration manager 150 may generate a recommendation based upon positive ratings by other users for printing devices of the same type. According to an embodiment, the configuration manager 150 considers printing device capability and/or compatibility in determining a recommendation. For example, the configuration manager 150 recommends configurations that are the most compatible with the hardware and/or software capabilities of a particular printing device for which the recommendation is being made. The configuration manager 150 provides the recommended configuration, or data that identifies the recommended configuration, to the device management system 180.

Upon completion, the user is queried whether they would like the customized configuration used for future initial configurations at the warehouse 110. If so, then the device management system 180 provides the customized configuration to the configuration manager 150, which updates both the configuration selection data 300 and the configuration data 310. The configuration manager 150 then propagates the changes to the configuration system 160 so that the customized configuration will be applied to new printing devices of that type for that customer. This may include the configuration system 160 updating the local configuration selection data 330 and the local configuration data 340, or portions thereof.

The device management system 180 maintains local configuration data 360 that includes configuration data 310 obtained from the configuration manager 150 and custom configurations created via the device management system 180. The device management system 180 also maintains local printing device data 370 that specifies information for printing devices managed by the device management system 180, which may be a subset of the printing devices represented in the printing device data 320 maintained by the configuration manager 150. For example, when a configuration is applied to a particular printing device, the local printing device data 360 is updated and also a notification is generated and transmitted to the configuration manager 150 so that the configuration manager 150 can update the printing device data 320, and also propagate those changes to the configuration system 160.

III. Managing Printing Device Configurations

The approach described herein for managing the configurations of printing devices is applicable to printing devices that have not been configured and printing devices that have already been initially configured. Embodiments are depicted in the figures and described herein in the context of a printing device that has been initially configured at the warehouse 110 and then reconfigured at the customer site 120, but embodiments are not limited to this example and the initial configuration and subsequent configuration may be performed at any location. The initial configuration may be performed, for example, using a printing device management system.

Figure 4:
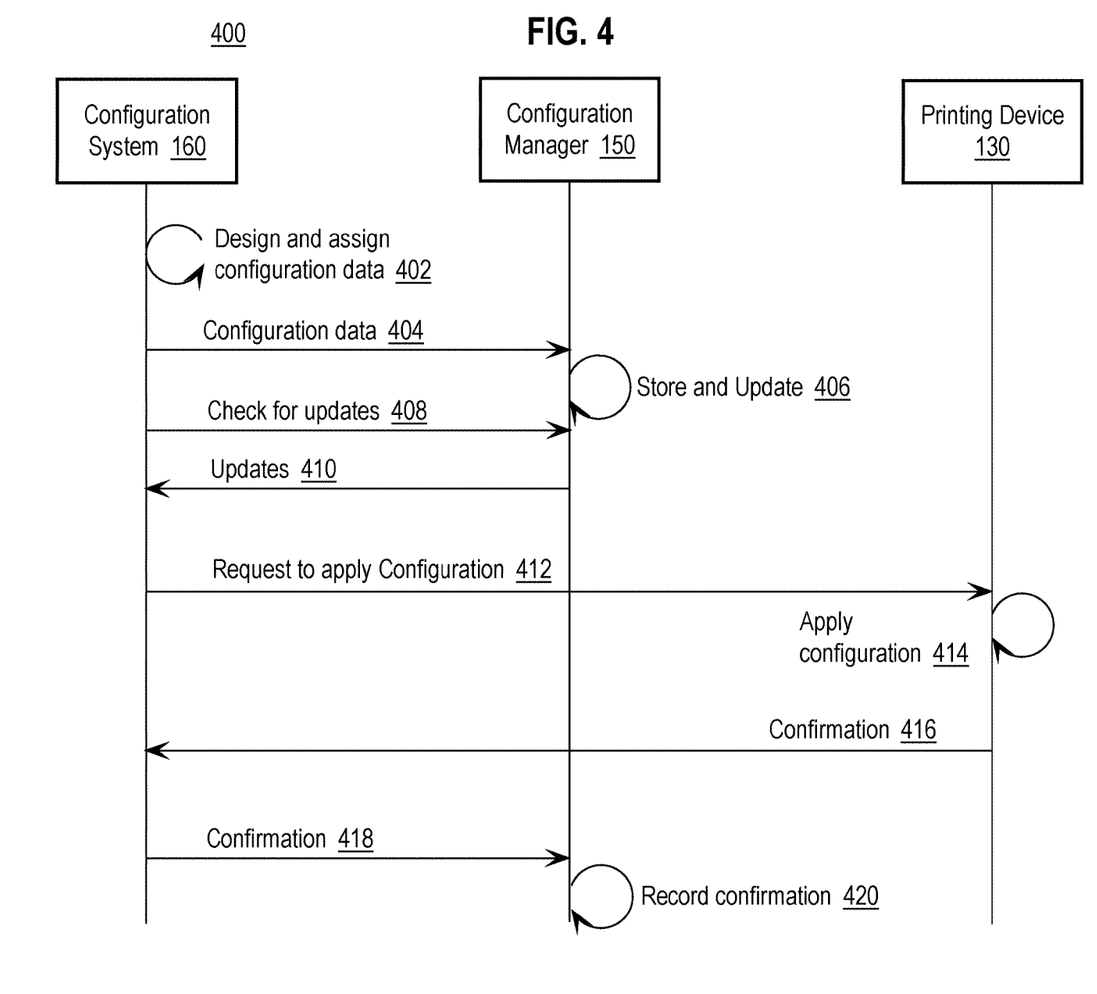
FIG. 4 is a message ladder diagram that depicts messages exchanged between the elements in arrangement during an initial configuration of the printing device.

FIG. 4 is a message ladder diagram 400 that depicts messages exchanged between the elements in arrangement 100 during an initial configuration of the printing device 130. Starting in step 402, a user of the configuration system 160 designs a configuration and assigns the configuration to a printing device. For example, a user uses a user interface provided by the configuration system 160 to create a configuration for a particular customer. The configuration system 160 updates the local configuration data 340 to include the new configuration, and also updates the local configuration selection data 330.

In step 404, the configuration system 160 provides the configuration data to the configuration manager 150 and in step 406, the configuration manager stores the configuration data in the configuration data 310. The configuration manager 150 also updates the configuration selection data 300 to specify that the configuration is to be used with the particular customer.

In step 408, the configuration system 160 checks for updates by generating and transmitting a request to the configuration manager 150 and in step 410 the configuration manager 150 provides updates to the configuration system 160. The updates may include updates to any of the configuration selection data 300, the configuration data 310, or the printing device data 320. The configuration system 160 updates the local configuration selection data 330, the local configuration data 340 and/or the local printing device data 350.

In step 412, the configuration system 160 generates and transmits a request to apply the configuration to the printing device 130. In step 414, the printing device 130 applies the configuration and in step 416 confirms that the configuration was applied to the printing device 130.

In step 418, the configuration system 160 generates and transmits to the configuration manager 150 a confirmation that the configuration was successfully applied to the printing device 130. In step 420, the configuration manager 150 records the successful configuration, for example, by updating the printing device data 320.

Figure 5:
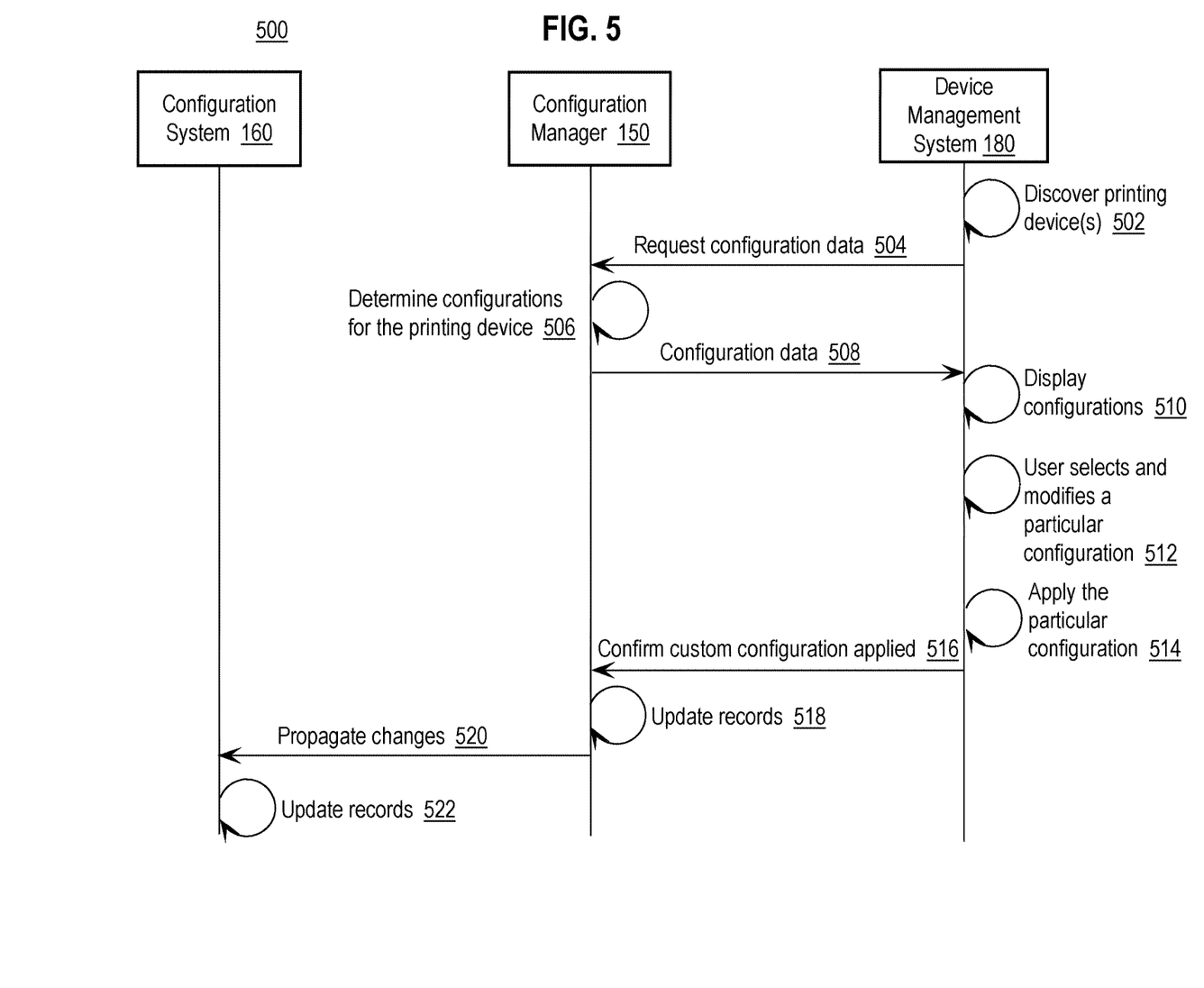
FIG. 5 is a message ladder diagram that depicts messages exchanged between the elements in arrangement during a configuration of the printing device at the customer site using a custom configuration.

FIG. 5 is a message ladder diagram 500 that depicts messages exchanged between the elements in arrangement 100 during a configuration of the printing device 130 at the customer site 120 using a custom configuration. It is presumed in this example that the printing device has been moved/shipped from the warehouse 110 to the customer site 120.

Starting in step 502, a user of the device management system 180 initiates a configuration session and the device management system 180 discovers printing devices. the device management system 180 displays data that identifies the discovered printing devices and the user selects a particular printing device to configure.

In step 504, the device management system 180 requests configuration data from the configuration manager 150. In request may include printing device identification data that uniquely identifies the particular printing device.

In step 506, the configuration manager 150 determines one or more configurations for the particular printing device. This may be performed by the configuration manager 150 examining the printing device data 320 to determine whether the particular printing device is configured and if not, use information from the printing device data 320, such as the type and/or customer, to select an appropriate configuration using the configuration selection data 300. As previously described here, the configuration manager 150 may also determine a recommended configuration based upon a variety of factors.

In step 508, the configuration manager 150 provides configuration data to the device management system 108. In step 510, the configuration manager 150 displays the one or more configurations and controls that allow a user to select a particular configuration. In step 512, a user selects and modifies the particular configuration to create a custom configuration, for example by changing one or more settings in the particular configuration. For example, the user may change one or more security settings that are compatible with the particular printing device or to satisfy a security policy.

According to an embodiment, the device management system 180 provides the capability for a user to combine multiple existing configurations to create a new configuration. This is particularly useful in situations where two templates each include a subset of available printing device settings and the user wishes to create a configuration that includes the settings from both configurations. For example, a first configuration may include paper/quality settings, effects settings, finishing settings and/or advanced settings that the user would like to use with printing devices, but the first configuration does not include security settings. A second configuration includes security settings that the user would like to use, but does not include the paper/quality settings, effects settings, finishing settings and/or advanced settings. Combining the first and second configurations allows the user to create a third configuration that includes the settings of both the first configuration and the second configuration. According to an embodiment, the device management system 180 determines whether configurations in a combination include the same settings with different values. If so, the device management system 180 identifies the conflict and provides controls that allow the user to resolve the conflict, for example, by manually selecting one of the conflicting values, or specifying an override value for the conflicted setting(s). The modified configuration is saved and in step 514 is applied to the particular printing device.

Upon successful application of the custom configuration to the printing device, in step 516, the device management system 180 generates and transits a confirmation to the configuration manager 150 that the custom configuration has been successfully applied to the particular printing device. The confirmation may include the custom configuration and/or configuration identification data, such as one or more hash values, signatures, checksums, etc., that uniquely identifies the custom configuration data. This may be used by the configuration manager 150 to determine whether the custom configuration data has been changed, or whether the custom configuration applied to a printing device has changed.

According to an embodiment, before performing steps 514 and 516, the configuration manager 150 may determine whether the custom configuration is compatible with the printing device to which it will be applied. The device management system 180 may transmit the custom configuration to the configuration manager 150 and request the compatibility check be performed and not apply the custom configuration until the configuration manager 150 confirms that the custom configuration is compatible with the printing device. This compatibility check may include the configuration manager confirming that the settings specified by the custom configuration are supported by the printing device.

In step 518, the configuration manager 150 updates its records. This may include the configuration manager 150 adding the custom configuration to the configuration data 310 and also updating the printing device data 320 to specify that the custom configuration has been applied to the particular printing device.

In step 520, the custom configuration is propagated to the configuration system 160 and in step 522, the configuration system 160 updates its records to specify that the custom configuration is to be used to configure new printing devices. This may include acquiring the custom configuration from the configuration manager 150 and updating the local configuration selection data 330, the local configuration data 340, and the local printing device data 350.

The approach for managing printing device configurations described herein provides several benefits. The approach maintains consistency of configurations between the configuration system 160 at the warehouse 110 and the device management system 180 at the customer site 120. The approach also provides a user-friendly way for users to create custom configurations for printing devices that are applied to new printing devices by the configuration system 160 at the warehouse 110.

IV. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
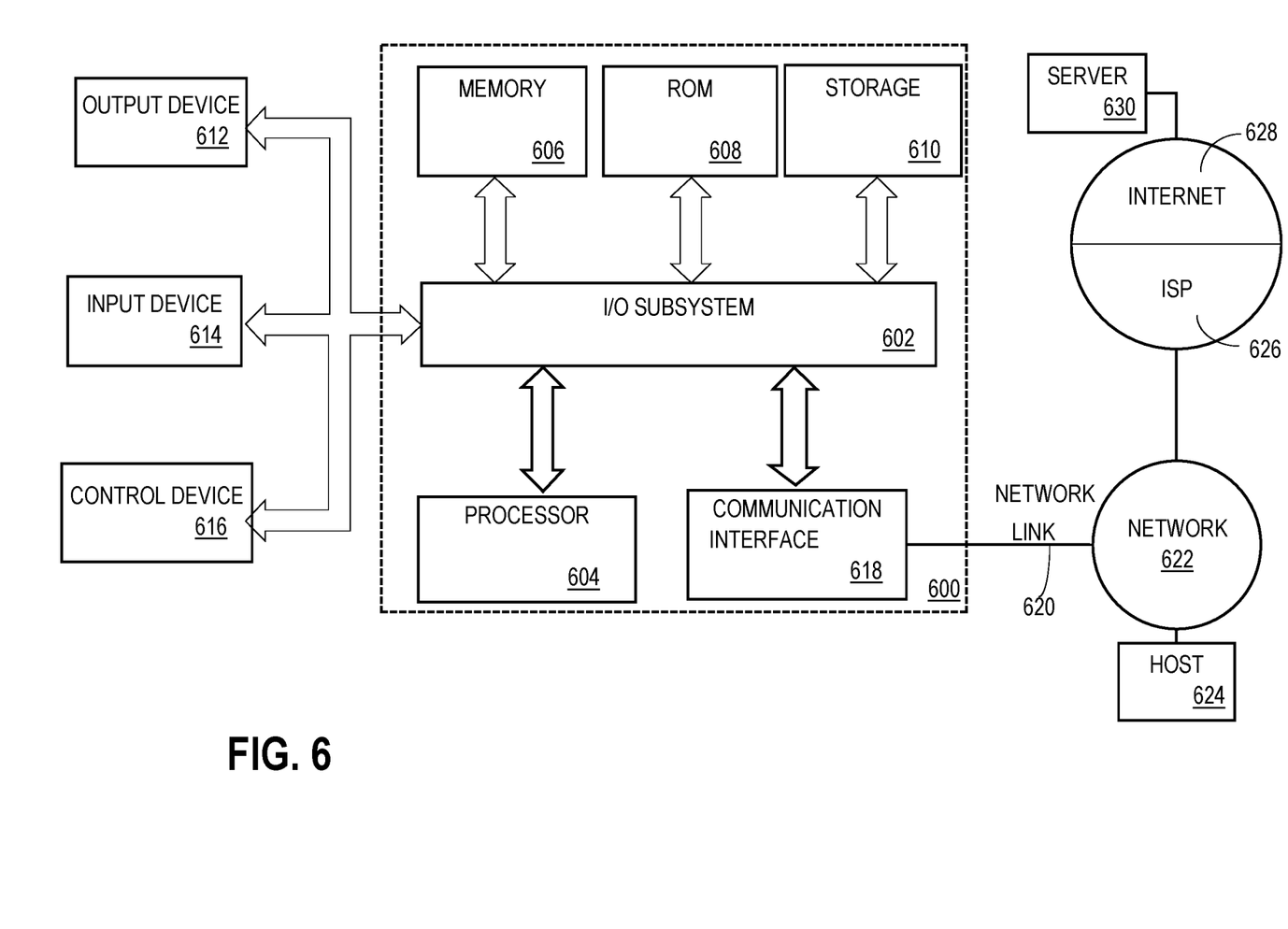
FIG. 6 is a block diagram that depicts an example computer system upon which embodiments may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The invention claimed is:

1. An apparatus comprising:
   one or more processors;
   one or more memories; and
   a configuration manager executing on the apparatus and configured to:
      receive, from a configuration system via one or more computer networks, first configuration data that specifies a first plurality of printing device settings,
      cause the first configuration data to be transmitted, via the one or more computer networks, to a device management system that includes a capability for a user to create, based upon the first configuration data, second configuration data that specifies a second plurality of printing device settings that is different than the first plurality of printing device settings,
      receive the second configuration data from the device management system via the one or more networks, and
      cause the second configuration data to be transmitted to the configuration system via the one or more networks, wherein the configuration system applies the second configuration data to one or more printing devices.

2. The apparatus as recited in claim 1, wherein:
   the second configuration data is assigned to a particular customer, and
   the configuration manager executing on the apparatus notifies the configuration system that the second configuration data is assigned to the particular customer so that the configuration system applies the second configuration data to printing devices of the particular customer.

3. The apparatus as recited in claim 2, wherein the configuration system applies the second configuration data instead of the first configuration data to printing devices of the particular customer.

4. The apparatus as recited in claim 1, wherein the configuration manager executing on the apparatus is further configured to determine whether the second plurality of printing device settings specified by the second configuration data is compatible with a particular printing device.

5. The apparatus as recited in claim 4, wherein the one or more factors include one or more of customer usage, industry trends, or user ratings.

6. The apparatus as recited in claim 1, wherein the configuration manager determines the first configuration data as a recommended configuration for a particular printing device based upon one or more factors.

7. The apparatus as recited in claim 1, wherein the configuration manager executing on the apparatus further receives, from the configuration system via the one or more computer networks, configuration identification that that uniquely corresponds to the first plurality of printing device settings specified by the first configuration data.

8. One or more non-transitory computer-readable media storing instructions which, when processed by one or more processors, cause:
a configuration manager executing on the apparatus to:
receive, from a configuration system via one or more computer networks, first configuration data that specifies a first plurality of printing device settings,
cause the first configuration data to be transmitted, via the one or more computer networks, to a device management system that includes a capability for a user to create, based upon the first configuration data, second configuration data that specifies a second plurality of printing device settings that is different than the first plurality of printing device settings,
receive the second configuration data from the device management system via the one or more networks, and
cause the second configuration data to be transmitted to the configuration system via the one or more networks, wherein the configuration system applies the second configuration data to one or more printing devices.

9. The one or more non-transitory computer-readable media as recited in claim 8, wherein:
the second configuration data is assigned to a particular customer, and
the configuration manager executing on the apparatus notifies the configuration system that the second configuration data is assigned to the particular customer so that the configuration system applies the second configuration data to printing devices of the particular customer.

10. The one or more non-transitory computer-readable media as recited in claim 9, wherein the configuration system applies the second configuration data instead of the first configuration data to printing devices of the particular customer.

11. The one or more non-transitory computer-readable media as recited in claim 8, wherein processing of the instructions by the one or more processes further causes the configuration manager executing on the apparatus to determine whether the second plurality of printing device settings specified by the second configuration data is compatible with a particular printing device.

12. The one or more non-transitory computer-readable media as recited in claim 11, wherein the one or more factors include one or more of customer usage, industry trends, or user ratings.

13. The one or more non-transitory computer-readable media as recited in claim 8, wherein the configuration manager determines the first configuration data as a recommended configuration for a particular printing device based upon one or more factors.

14. The one or more non-transitory computer-readable media as recited in claim 8, wherein the configuration manager executing on the apparatus further receives, from the configuration system via the one or more computer networks, configuration identification that uniquely corresponds to the first plurality of printing device settings specified by the first configuration data.

15. A computer-implemented method comprising:
a configuration manager executing on an apparatus:
receiving, from a configuration system via one or more computer networks, first configuration data that specifies a first plurality of printing device settings,
causing the first configuration data to be transmitted, via the one or more computer networks, to a device management system that includes a capability for a user to create, based upon the first configuration data, second configuration data that specifies a second plurality of printing device settings that is different than the first plurality of printing device settings,
receiving the second configuration data from the device management system via the one or more networks, and
causing the second configuration data to be transmitted to the configuration system via the one or more networks, wherein the configuration system applies the second configuration data to one or more printing devices.

16. The computer-implemented method as recited in claim 15, wherein:
the second configuration data is assigned to a particular customer, and
the configuration manager executing on the apparatus notifies the configuration system that the second configuration data is assigned to the particular customer so that the configuration system applies the second configuration data to printing devices of the particular customer.

17. The computer-implemented method as recited in claim 16, wherein the configuration system applies the second configuration data instead of the first configuration data to printing devices of the particular customer.

18. The computer-implemented method as recited in claim 15, further comprising the configuration manager executing on the apparatus determining whether the second plurality of printing device settings specified by the second configuration data is compatible with a particular printing device.

19. The computer-implemented method as recited in claim 18, wherein the one or more factors include one or more of customer usage, industry trends, or user ratings.

20. The computer-implemented method as recited in claim 15, wherein the configuration manager determines the first configuration data as a recommended configuration for a particular printing device based upon one or more factors.

* * * * *

UNITED STATES PATENT AND TRADEMARK OFFICE
CERTIFICATE OF CORRECTION

PATENT NO. : 11,200,009 B2  
APPLICATION NO. : 16/805654  
DATED : December 14, 2021  
INVENTOR(S) : Tom Haapanen Page 1 of 1

It is certified that error appears in the above-identified patent and that said Letters Patent is hereby corrected as shown below:

In the Claims

Column 16, Claim 1, Line 55, delete "one or more networks" and insert --one or more computer networks--
Column 16, Claim 1, Lines 58-59, delete "one or more networks" and insert --one or more computer networks--
Column 17, Claim 8, Line 41, delete "one or more networks" and insert --one or more computer networks--
Column 17, Claim 8, Lines 44-45, delete "one or more networks" and insert --one or more computer networks--
Column 18, Claim 15, Line 33, delete "one or more networks" and insert --one or more computer networks--
Column 18, Claim 15, Lines 36-37, delete "one or more networks" and insert --one or more computer networks--

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*